A. B. KLAY.
WARE TRUCK.
APPLICATION FILED MAY 26, 1916.
1,230,306.
Patented June 19, 1917.
4 SHEETS—SHEET 1.
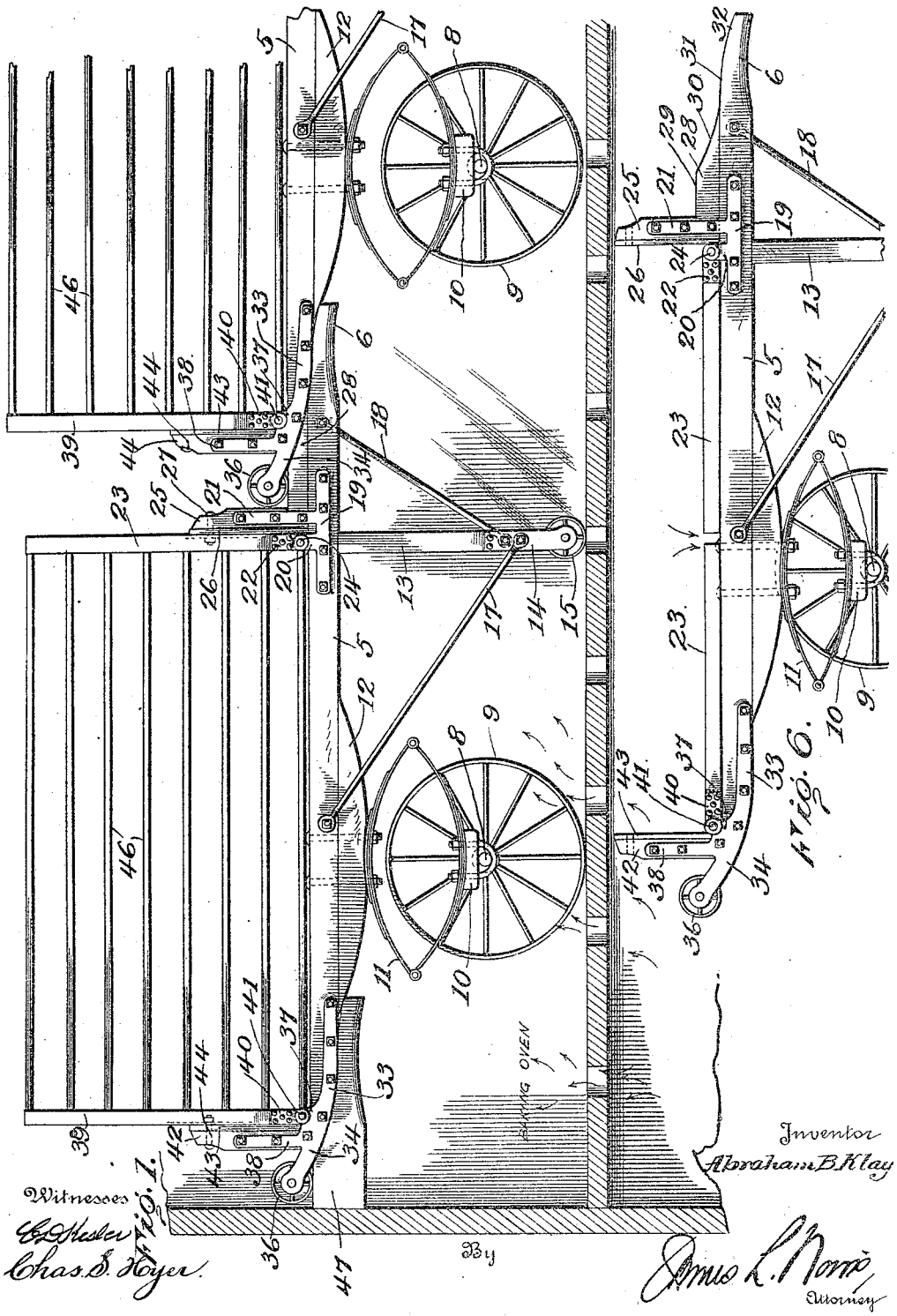

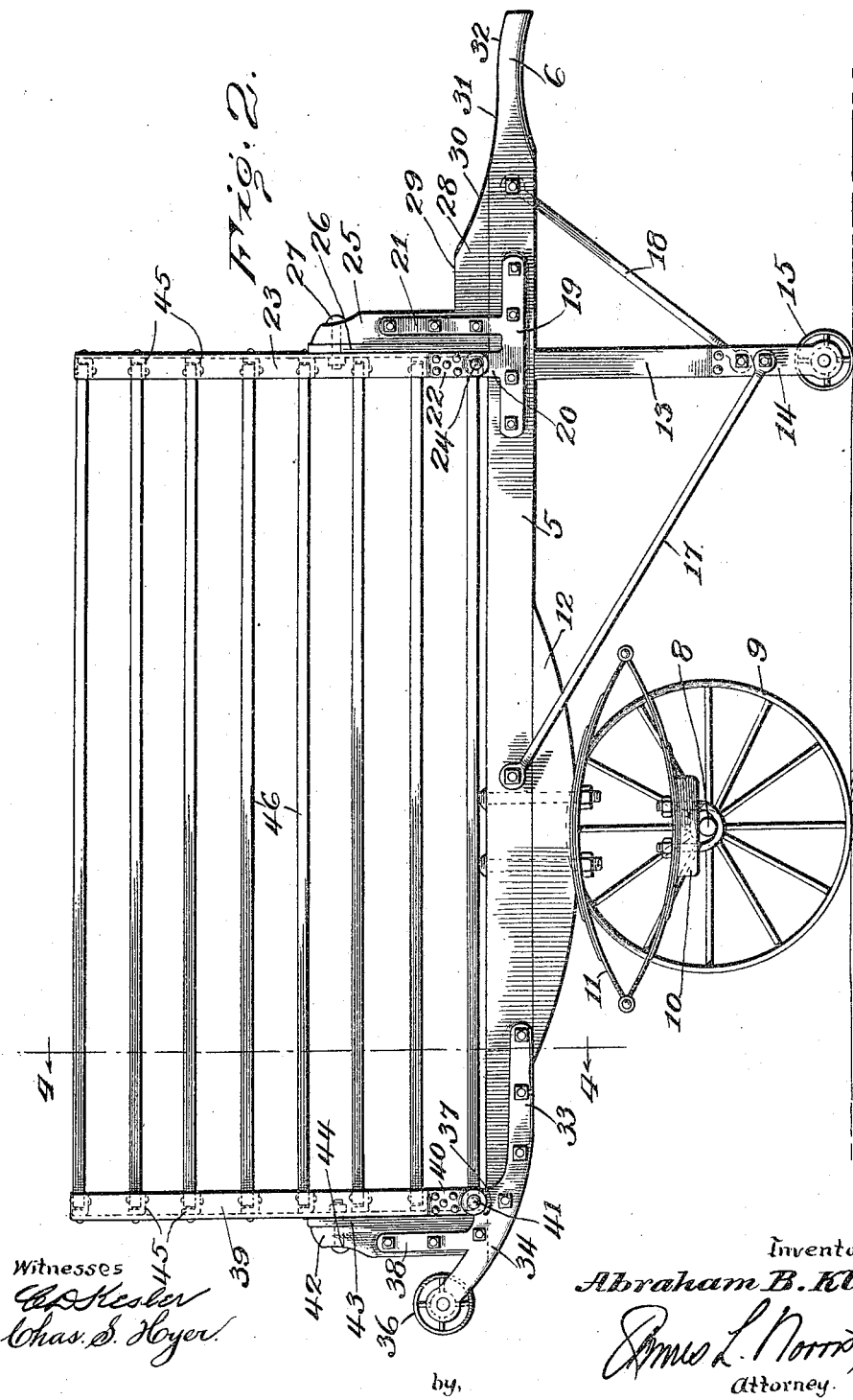

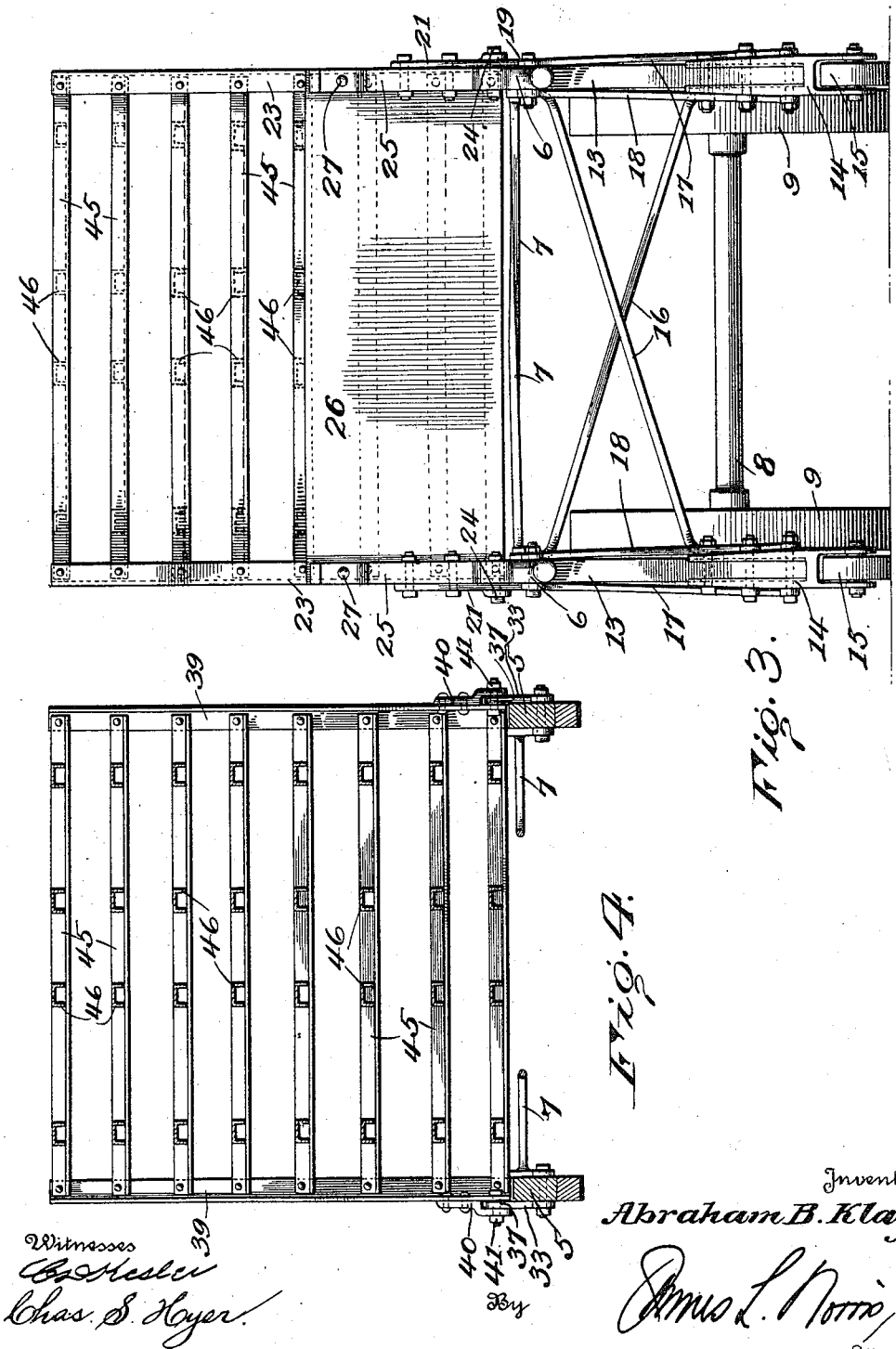

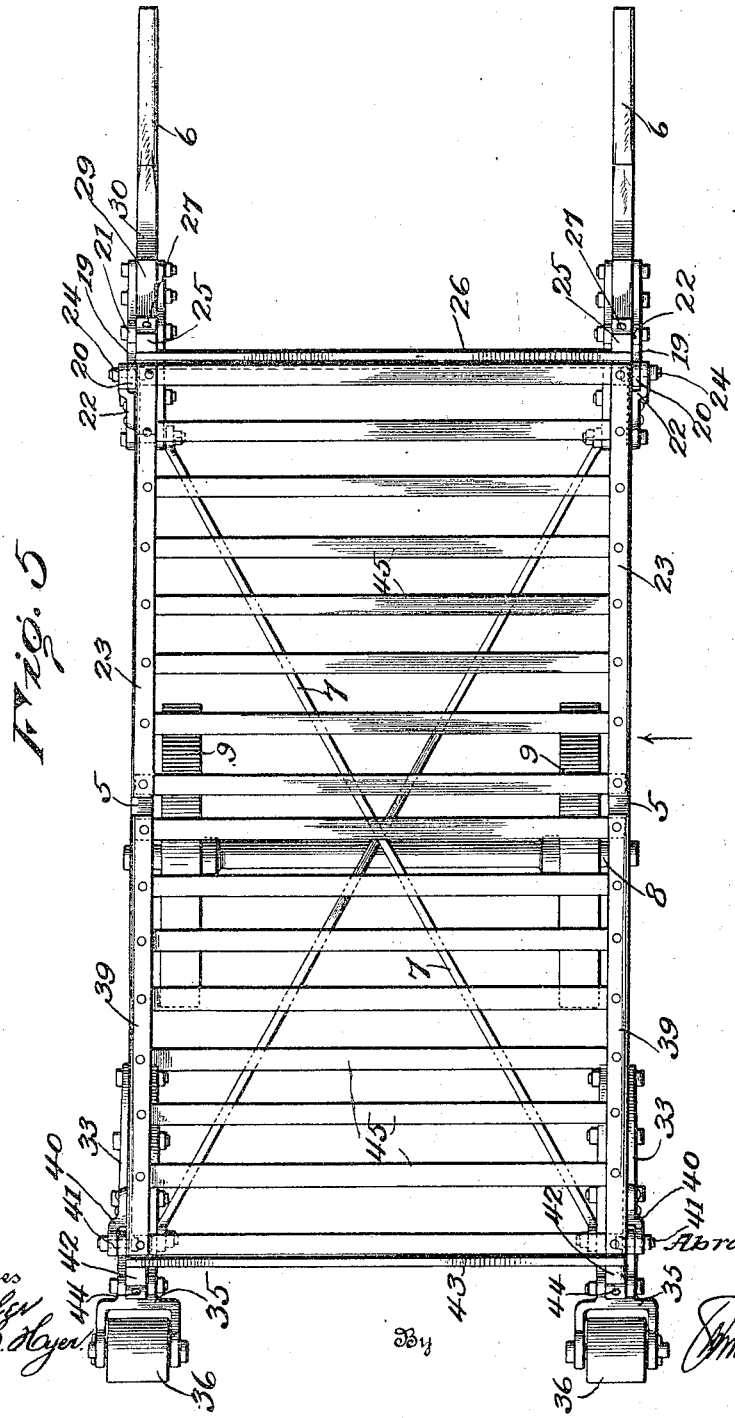

UNITED STATES PATENT OFFICE.

ABRAHAM B. KLAY, OF MODESTO, CALIFORNIA.

WARE-TRUCK.

1,230,306.   Specification of Letters Patent.   Patented June 19, 1917.

Application filed May 26, 1916. Serial No. 100,141.

*To all whom it may concern:*

Be it known that I, ABRAHAM B. KLAY, a citizen of the United States, residing at Modesto, in the county of Stanislaus and State of California, have invented new and useful Improvements in Ware-Trucks, of which the following is a specification.

This invention relates to ware trucks adapted for transporting tiles, bricks, pipes or any other form of ware which is shaped by pressure, molded or otherwise produced from plastic material and requiring a drying treatment by heat prior to burning in a kiln or analogous device.

One object of the invention is to provide a ware truck having running gear including supporting springs and means for relieving the springs of weight or depression by load thereon during the time that the truck may be disposed in a drying inclosure and thereby prevent deterioration of the springs of the truck. A further object of the invention is to provide a convertible ware truck or one having sides and ends for holding pallets carrying ware of any kind through the medium of supporting means removably applied to the truck or to produce a truck which will have a flat bed to receive bricks, pipes or other similar devices in stack thereon, the truck in either form serving not only as a transporting means for the ware of different kinds that may be held thereby, but also as a supporting means for such ware while the latter is being dried by heat.

In transporting vehicles or trucks for ware as heretofore constructed, the springs included as a part of the running gear, and giving the bodies of the vehicles or trucks ample resiliency or cushioning effect when the wheels of the truck are moving over the openings or grated structure of the floors of drying compartments, have been required to sustain the loads during the time that the vehicles or trucks are within the drying inclosures or compartments, and as a consequence the springs deteriorated and failed in a comparatively short time to provide that degree of cushioning effect or resiliency relatively to the bodies of the vehicles or trucks necessary to avoid displacement of the ware carried by the vehicles or trucks. The present improvement in ware trucks overcomes this disadvantage in that the load on each truck is relieved from the springs and the latter are thus preserved in their cushioning or resilient effect, and as a consequence the improved truck is much more serviceable and satisfactory in its operation. The improved truck is also simplified in its construction and in view of the capability of converting the same into different forms considerable reduction in the expense of transporting vehicles or trucks for ware results, as one truck may be used for various kinds of ware. In addition to the conveniences incident to the conversion of the improved truck from one form into another, a greater number of the trucks may be stored within a drying inclosure or compartment by reason of the close assemblage thereof and interacting supporting association than would be possible with the ordinary ware vehicles or trucks.

A preferred form of the improved truck is shown in the accompanying drawings for the purpose of demonstrating one practical organization thereof, but it will be understood that modifications within the scope of the invention will be adopted and that the truck is not confined to the exact details of construction shown.

In the drawings:

Figure 1 is a side elevation showing several trucks closely associated in supporting relation within a heating inclosure or compartment and embodying the features of the invention.

Fig. 2 is a side elevation of the truck in one form.

Fig. 3 is an end elevation of the truck shown by Fig. 2.

Fig. 4 is a cross-section taken in the plane of the line 4—4, Fig. 2.

Fig. 5 is a top plan view of the truck shown by Fig. 2 arranged in flat form.

Fig. 6 is a side elevation of the truck shown by Fig. 5.

The bed of the truck is composed of opposite side bars or members 5 projected at one end to form handles or grips 6 and connected by cross-braces 7 in the form of rods which are terminally bolted to the inner opposing sides of the bars or members 5 and crossed at about the center of the bed. An axle 8 is arranged at a central point beneath the bed and has ground or carrying wheels 9 mounted thereon, and connected over the opposite extremities of the axle are supporting blocks 10 to which the lower portions of springs 11 are secured, the upper portion of each spring bearing against and secured to a bolster 12 which is fastened against the under edge or bottom of each side bar or member 5. The truck is therefore resiliently supported relatively to the axle 8 and ground or carrying wheels 9 for the purpose of effecting an easy riding movement of the contents of the truck, particularly when the wheels 9 move over a grated or perforated flooring of a drier or over rough surfaces so as to avoid displacement of the ware that may be loaded on the truck. Depending from the side bars or members 5 nearer the handles or grips 6 are legs 13 to which metal brackets or roller supports 14 are secured and have rollers 15 at the lower ends thereof to assist in the free movement of the truck and to permit a free movement of the truck when let down and the rollers 15 engage the surface upon which the truck may be disposed. The legs 13 are tied by cross-braces 16 to render the same rigid and of sufficient strength to support the extremity of the truck adjacent to the handles or grips 6. The legs 13 are further braced by rods 17 and 18 respectively connected to the outer sides of the bars or members 5 and the brackets 14 and to the inner sides of said bars or members 5 and the corresponding sides of the brackets.

On the outer side of each bar or member 5 and partially extending over the handle or grip 6 of the latter is a combined brace and fulcrum iron comprising a lower longitudinally straight body 19 secured by suitable bolts and having an upwardly extending short arm 20 and a longer arm 21 spaced from and in advance of the arm 20. The short arm 20 is associated with a plate or hinge member 22 secured to the lower extremity of an upright or corner post 23, the hinge member 22 being connected to the arm 20 by a suitable hinge or pivotal joint 24. The arm 21 is secured to a wood or other post 25 having its inner side spaced a predetermined distance from the adjacent edge of the upright or post 23. This construction is duplicated at opposite corners of the truck body adjacent to the handles or grips 6, and in the spaces formed between the opposite posts 23 and 25 an end board 26 is inserted and secured by removable bolts 27 passing through the upper extremities of the said posts, the said end board and portions of the uprights or posts 23. When the bolts 27 engage the parts just specified the uprights or posts 23 are held perpendicularly straight in a positive or rigid manner. Secured on the upper edge of each handle or grip 6 and having its rear end abutting against a portion of the outer edge of the adjacent post 25 is a rest block or member 28 having an upper horizontally straight rest surface 29 and a curved edge 30 extending from said rest surface regularly to the upper edge of the handle or grip 6 which is curved in the same arc, as at 31, and then merges off into a reverse curve 32 to the terminal of the handle or grip. The curves 30 and 31 are concave, and the curve 32 convex, and these combined curves form a track or way for a purpose which will be presently explained.

At the front end of the truck the forward extremity of each side bar or member 5 is embraced by the members of a fork 33 having its rear extremity directed or inclined upwardly, as at 34, and yoked as at 35 to receive a roller 36 having a suitable bearing means in the extremities of the members of the yoke. The fork 33 at its outer portion has a short vertical projection 37 and a vertical arm 38 similar to the arm 21 heretofore described. The front end of the truck body also has corner uprights or posts 39 to the lower end of which hinge or connecting plates 40 are fixed, and the lower end of each plate 40 and the upper terminal of the projection 37 are provided with connecting hinge or fulcrum means 41 similar to the hinge or connecting means 24 above specified. From the front extremity of each side bar or member 5 a post 42 extends vertically, and thereto the arm 38 is secured, said post 42 and arm 38 being similar to the post 25 and arm 21 hereinbefore explained and located at the extremity of the truck adjacent to the handles or grips 6. The posts 42 at opposite sides of the front end of the truck are spaced a predetermined distance from the adjacent sides of the uprights or posts 39 and a front end board 43 is introduced at its opposite extremities in the spaces between the posts 42 and the uprights or posts 39 and secured by removable bolts 44 in all respects similar to the bolts 27.

The uprights or posts 23 and 39 are preferably constructed of suitable angle iron with the flanged sides thereof outermost at the opposite sides and ends of the truck body, and between these uprights or posts and firmly secured thereto is a plurality of angle iron supports 45 preferably of L-shape, the said supports being disposed at regular distances apart to provide ledges which are adapted to be used for two purposes, namely, conjointly as holding means for bricks, pipes or other ware when the truck is converted into a flat body truck as will be hereinafter explained, or as means for engagement by the ends of rests 46 which are disposed at regular intervals lengthwise of the body of the truck and preferably formed of U-shaped iron and arranged with their open sides downwardly. These rests 46 are adapted to hold pallets containing tile, the pallets being introduced from opposite sides of the truck and disposed on the said rests 46 in tiers, and in such condition the truck may be propelled from its point of loading into a drying inclosure or compartment and permitted to stand with its load until the tile or other ware held thereby is sufficiently dried for burning.

It is obvious that the springs 11 become compressed by the load weight of the truck, and if the truck was permitted to stand with the springs thus compressed during the drying operation, said springs would soon become deteriorated and would not provide that resiliency and cushioning effect relatively to the body of the truck above necessary when propelling the loaded truck over a slatted or apertured surface usually found in drying rooms or compartments, and as a consequence the jar and jolt on the body of the truck would displace the pallets and ware on the latter composing the load of the truck, with material disadvantages and inconvenience. To overcome this deterioration of the springs of a truck of this type, sustaining means for lifting the load of the truck, as it were, from the springs is provided in the present improvement and involves the rollers 36 which have their greatest normal depression or downward extent below the plane of the horizontal surfaces 29 of the blocks 28, but higher than the lowermost portions of the upper curved edges 32 of the handles or grips 6 so that the rollers 36 of successive trucks run into a drying room or inclosure may be pushed upwardly over the handles or grips 6 or the curved edges 32 and 31 of the handles and the curved edges 30 of the blocks 28 onto the horizontal surfaces 29, and as a result the ground or carrying wheels 9 are permitted to remain in contact with the flooring or bottom surface of the drying room or compartment and the load weight is taken off the springs 11 to avoid straining or deteriorating the latter. This arrangement of the trucks is clearly shown by Fig. 1, and the one side wall of the heating inclosure or compartment will be provided with projections 47 having an upper contour similar to that of the handles 6 and the blocks 28. This close association of the trucks within a drying inclosure or compartment will also provide for economizing space whereby a greater number of trucks may be disposed in an inclosure or compartment of a given area as compared to the number of trucks usually employed, and by such means also the drying inclosure or compartment will be caused to have a greater capacity or a greater quantity of ware may be arranged thereon for drying purposes.

As shown by Figs. 5 and 6, the truck may be arranged in flat form, after first withdrawing the rests 46 and disconnecting the posts 25 and 42 from the uprights 23 and 39 by removing the bolts 27 and 44. The uprights or corner posts 23 and 39 are then turned inwardly and downwardly on the side bars or members 5 until the flanges of the supports 45, which are vertical when the uprights or posts are arranged as shown by Figs. 1, 2, 3 and 4, have assumed a horizontal position to provide a plurality of flat bearing slats. In this form the truck is adapted to have bricks, tile or other ware stacked thereon and propelled into a drying inclosure or compartment and arranged as hereinbefore explained to take the load weight off the springs and also to economize in the space occupied by the trucks in this form in the drying inclosure or compartment. At any time desired the truck may be reconverted into the form shown by Figs. 1 to 4, inclusive, and where a number of trucks are used in a drying plant a part of the same may be employed with the uprights or posts 23 and 39 perpendicularly disposed and a part with the said uprights or posts turned down horizontally on the side bars or members 5. The conversion of the truck from one form to another may be expeditiously carried on in view of the fact that it is only necessary to withdraw the rests 46 and remove the bolts 27 and 44 to disconnect the uprights 23 and 39, the remaining portion of the truck structure being undisturbed.

What is claimed is:

1. A ware truck having carrying wheels and spring cushioning means between the wheels and body thereof, and means forming part of the organization of the truck for engagement with a supporting means for relieving the load weight from the springs when the truck is at rest.

2. A ware truck having carrying wheels and springs introduced between the latter and the body of the truck, and engaging means at opposite extremities of the truck for relieving the springs of the load weight of the truck.

3. A ware truck having carrying wheels for propelling the same and springs introduced between the wheels and the body of the truck, supporting means at one end of the truck, and movable means at the opposite end of the truck, the movable means at one end of one truck being operative to engage the supporting means at the opposite end of a similar adjacent truck.

4. A ware truck having a body, carrying wheels and springs between the wheels and body, and coöperating terminal means for engagement with a supporting means for relieving the springs of the load weight of the truck.

5. A ware truck having a body, carrying wheels and springs between the wheels and body, rollers at one end of the body, and supporting means at the opposite end of the body for engagement by the end rollers of an adjacent similar truck.

6. A ware truck having a body, carrying wheels and resilient cushioning means between the wheels and body, rollers at one end of the body, and rest devices at the opposite end of the body over and onto which the rollers of an adjacent similar truck are movable.

7. A ware truck having a body, carrying wheels and resilient cushioning means between the wheels and body, rollers at one end of the body, and rest devices at the opposite end of the body for engagement by the rollers of an adjacent similar truck, the rest devices being at a greater elevation than the normal dependence of the rollers.

8. A ware truck having a body, carrying wheels and resilient cushioning means between the wheels and body, rollers at one end of the body, and devices at the opposite end of the body having guide and flat rest surfaces for engagement by rollers of an adjacent similar truck.

9. A ware truck having a body, carrying wheels, resilient cushioning means for the body and handles at one end of the body with upper roller engaging surfaces, rest devices with flat surfaces adjacent to the body and having roller engaging surfaces merging into the roller engaging surfaces of the handles, and rollers at the opposite end of the body, the said roller engaging and flat surfaces being provided for coöperation with rollers of an adjacent truck.

10. A ware truck having a body, carrying wheels and resilient cushioning means for the body, and means above the springs and carrying wheels for relieving the resilient cushioning means of load weight when the truck is at rest.

11. A ware truck having a body, carrying wheels and resilient cushioning means between the wheels and body, and means fixed to opposite extremities of the truck above the resilient cushioning means and wheels for engagement with supporting means for relieving the resilient cushioning means of load weight when the truck is at rest.

12. In a ware truck, a body having inwardly folding corner uprights, cross supports secured to the uprights at each end of the body, and longitudinal rests removably mounted between the cross supports.

13. In a ware truck, a body having corner uprights foldable inwardly and disposable in horizontal planes, cross supports secured to the pairs of uprights at each end of the body and forming ledges when the uprights are elevated and cross supporting bars when the uprights are in horizontal positions, and removable longitudinal rests terminally engaging the cross supports when the uprights are elevated.

14. In a ware truck, a body having angle iron uprights pivoted at their lower extremities and disposable in horizontal planes, the pairs of uprights at opposite ends of the body having angle iron cross supports secured thereto and forming ledges when the uprights are elevated and providing supporting bars when the uprights are lowered, and removable angle iron rests disposed longitudinally between and engaging the ledges when the uprights are raised.

15. In a ware truck, a body having fixed posts extending upwardly therefrom at opposite extremities, corner uprights adjacent to the posts and foldable inwardly into horizontal planes, the corner uprights at opposite extremities of the body being connected by cross supports, end boards mounted between the posts and the corner uprights, and longitudinally disposed rests removably mounted between and engaging the supports connecting the uprights.

16. In a ware truck, a body comprising side bars, fixed posts rising from the side bars, uprights pivotally mounted at distances inwardly from the posts and capable of being disposed in horizontal positions, cross supports connecting the uprights at each extremity of the body, end boards mounted between the posts and the uprights, fastening devices removably engaging the posts, the end boards, and the uprights, and means removably arranged between the uprights to serve as rests.

17. A ware truck having a body with pivoted corner uprights connected in pairs by cross supports, and means removably engaging the cross supports of the uprights, the cross supports of the uprights serving as ledges to hold said means when the uprights are elevated, the uprights being disposable in horizontal planes to arrange the cross supports as cross bars and whereby the truck may be converted into a flat form.

18. A ware truck having a body with movable members capable of being used to form a truck with an upright body or a truck with a flat body, the truck when arranged with a flat body having the movable members serving as the supporting means for the load.

In testimony whereof I have hereunto set my hand in presence of two subscribing witnesses.

ABRAHAM B. KLAY.

Witnesses:
 CHAS. S. HYER,
 S. E. WHITE.

Copies of this patent may be obtained for five cents each, by addressing the "Commissioner of Patents, Washington, D. C."